(12) United States Patent
Minor et al.

(10) Patent No.: US 8,806,705 B2
(45) Date of Patent: Aug. 19, 2014

(54) LEAF BLOWER

(76) Inventors: John M. Minor, Ameila, OH (US);
David L. Hamann, Cincinnati, OH (US)

( * ) Notice: Subject to any disclaimer, the term of this patent is extended or adjusted under 35 U.S.C. 154(b) by 75 days.

(21) Appl. No.: 12/384,958

(22) Filed: Apr. 10, 2009

(65) Prior Publication Data

US 2012/0131762 A1    May 31, 2012

(51) Int. Cl.
*A47L 5/14* (2006.01)

(52) U.S. Cl.
USPC ................................................ 15/344; 15/405

(58) Field of Classification Search
USPC ............. 15/405, 345, 315, 327.5, 328, 134.1, 15/344
See application file for complete search history.

(56) References Cited

U.S. PATENT DOCUMENTS

| | | | | |
|---|---|---|---|---|
| 1,364,360 | A * | 1/1921 | Emery | 417/234 |
| 4,756,668 | A * | 7/1988 | Gassen et al. | 416/247 R |
| 5,522,115 | A * | 6/1996 | Webster | 15/330 |
| 5,659,920 | A * | 8/1997 | Webster et al. | 15/344 |
| 7,266,860 | B2 * | 9/2007 | Tate et al. | 15/330 |
| 7,814,615 | B1 * | 10/2010 | Ries | 15/405 |
| 2005/0210624 | A1 * | 9/2005 | Lammers et al. | 15/344 |

* cited by examiner

*Primary Examiner* — Dung Van Nguyen

(57) ABSTRACT

The invention is a leaf blower with a handle extended from the rear opposite the exhaust blower pipe. The exhaust pipe has a turned down blower orifice extender. The leaf blower has an air inlet on the upper surface. Various handgrips which operate with the extended handle aids the movement of the blower pipe. The leaf blower may be held at the operators side or attached with various devices to a belt or neck harness with hooks or pommels on the extended handle.

18 Claims, 11 Drawing Sheets

Current art

Figure 2
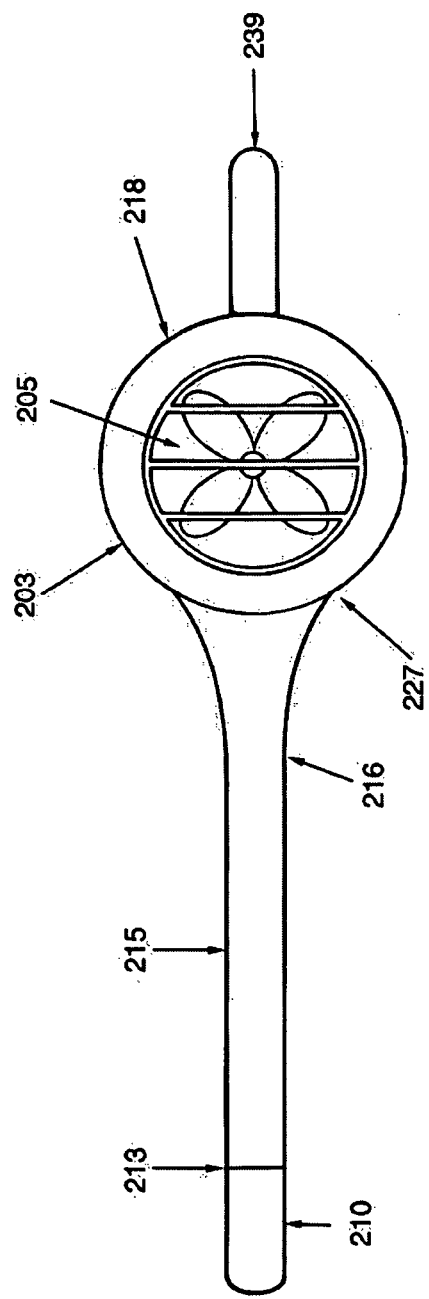
Fig. 2A
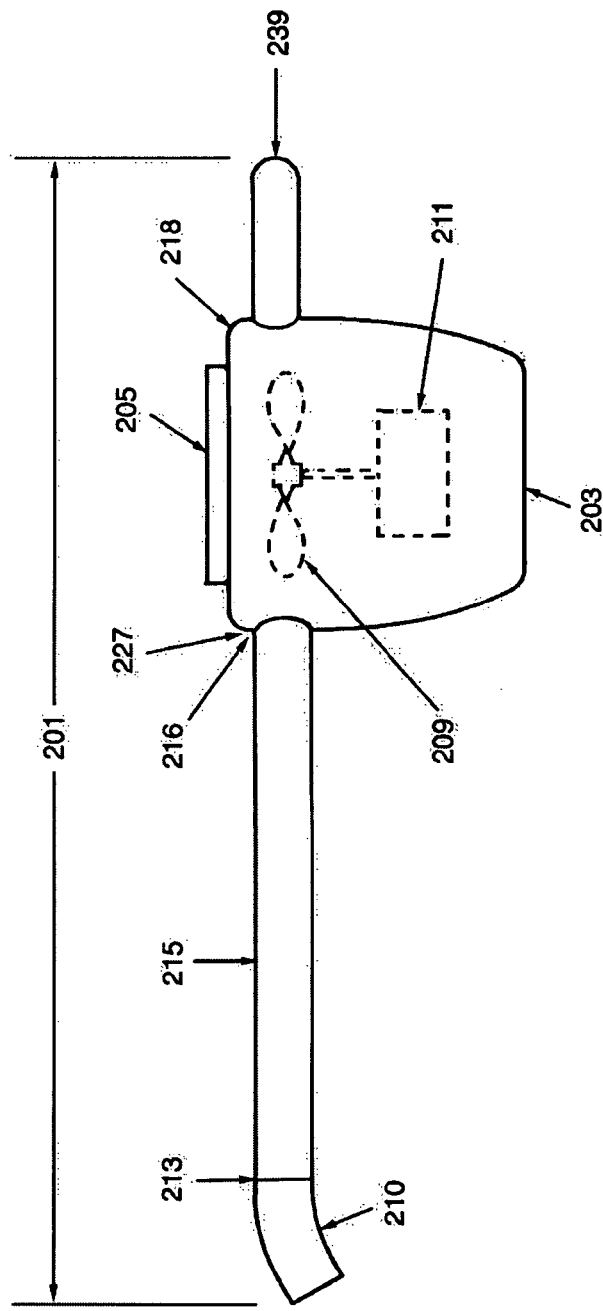
Fig. 2B

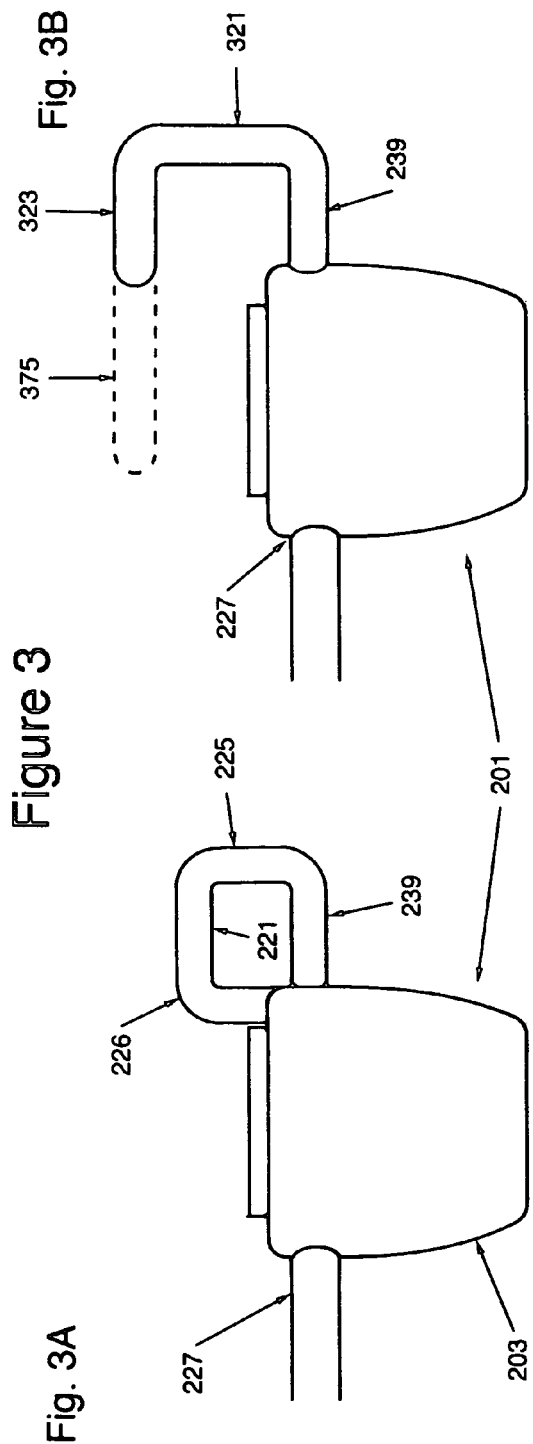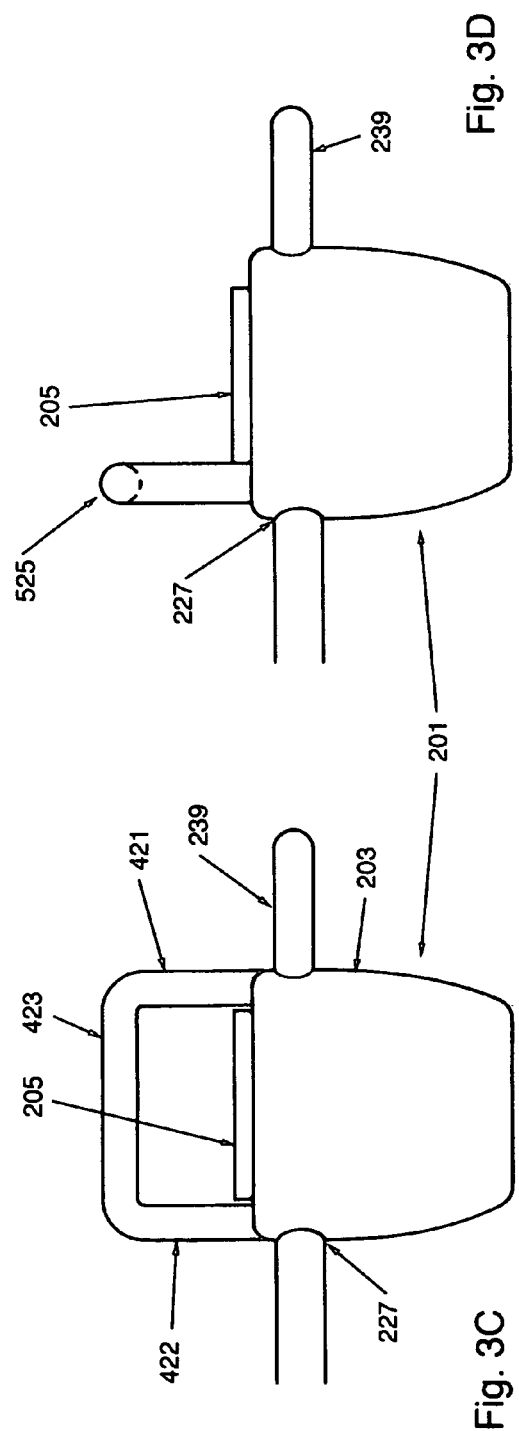

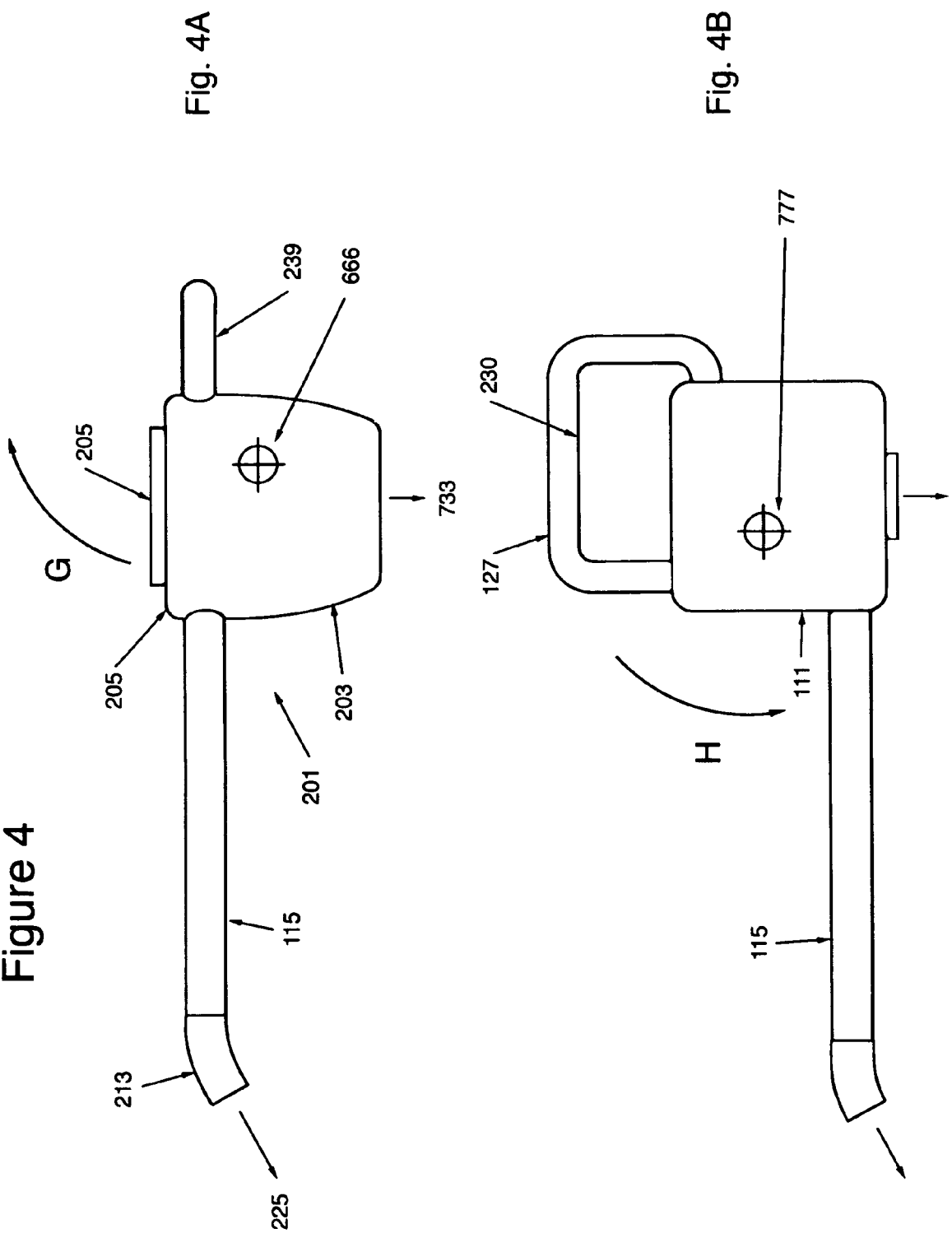

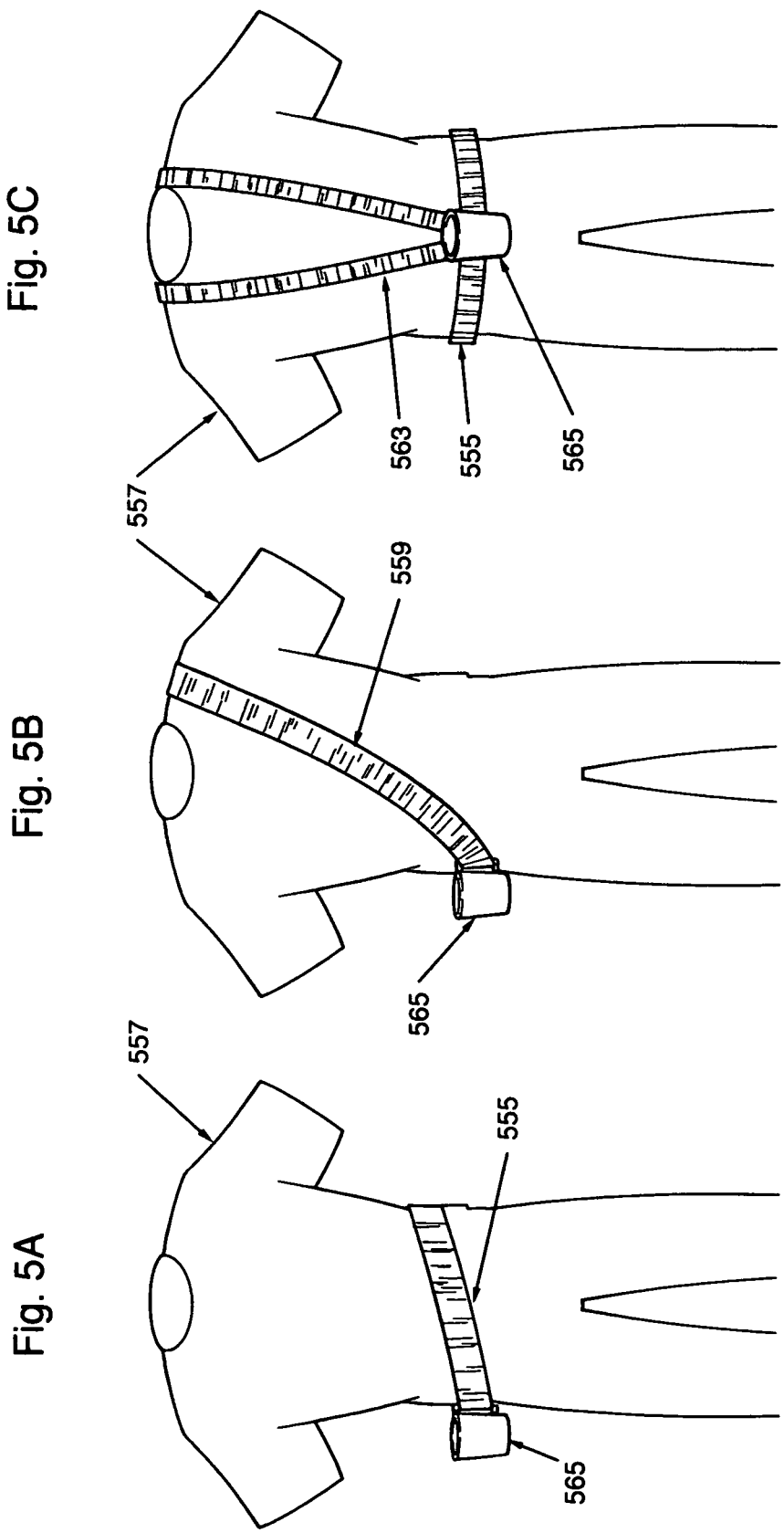

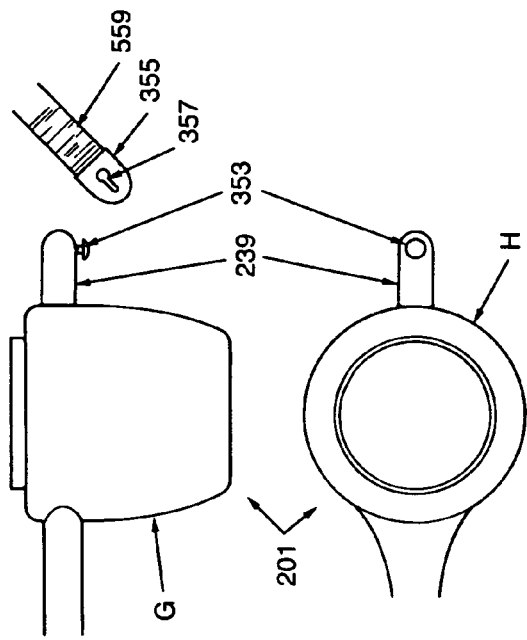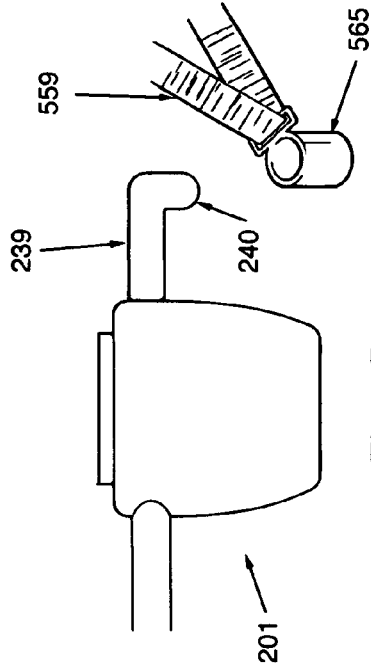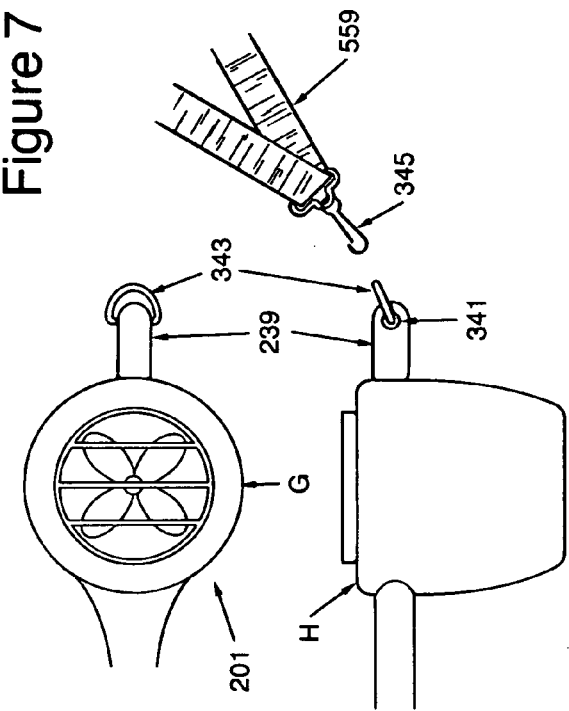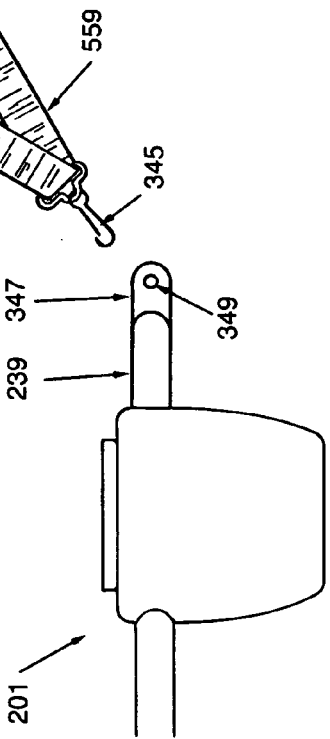
Figure 7
Fig. 7A
Fig. 7B
Fig. 7C
Fig. 7D

Figure 8
Fig. 8A
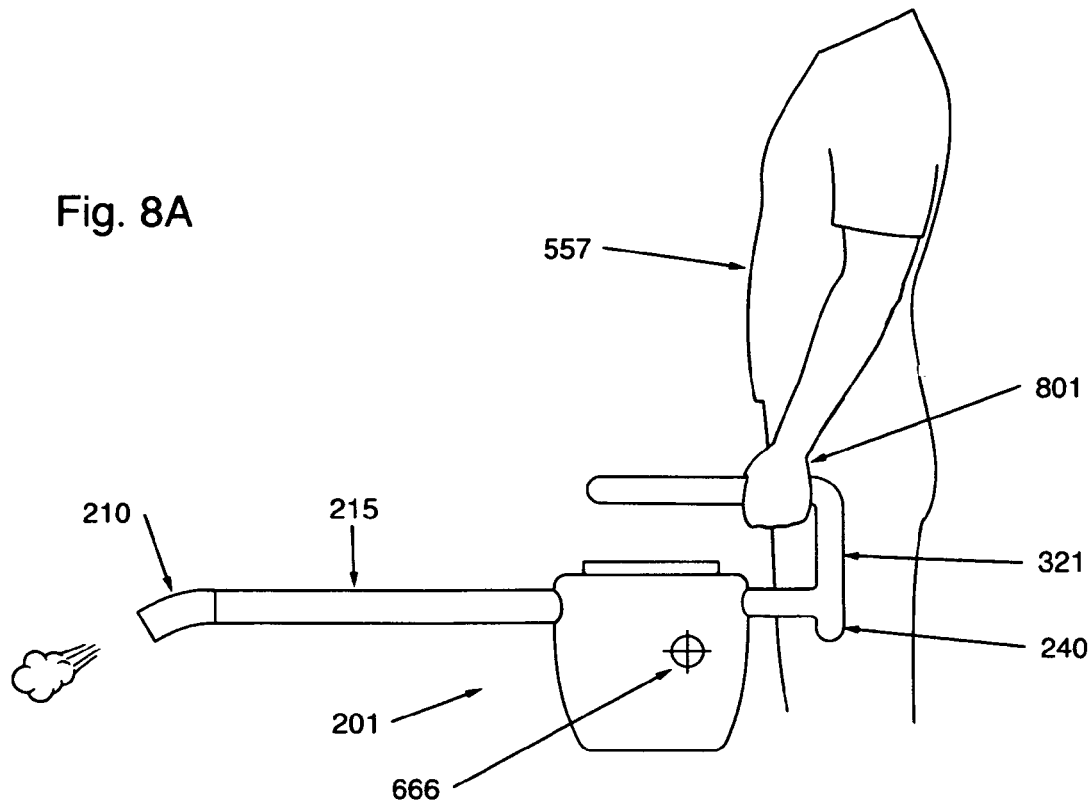
Fig. 8B
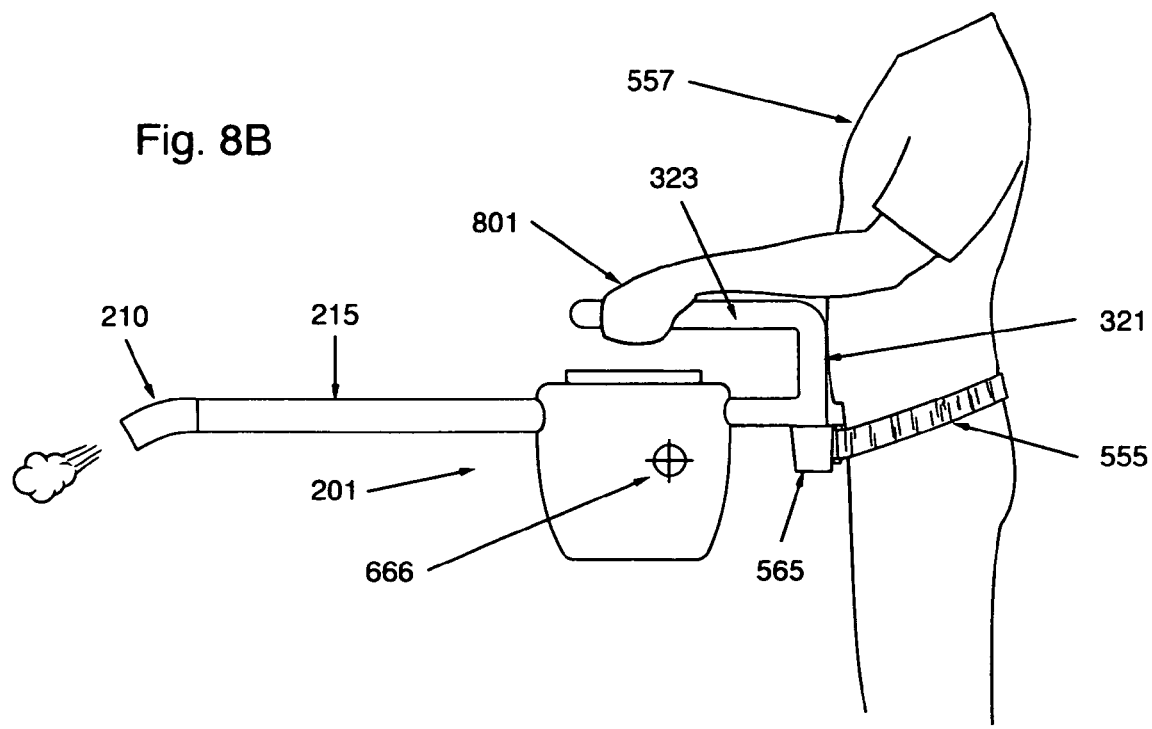

Figure 9
Fig. 9A
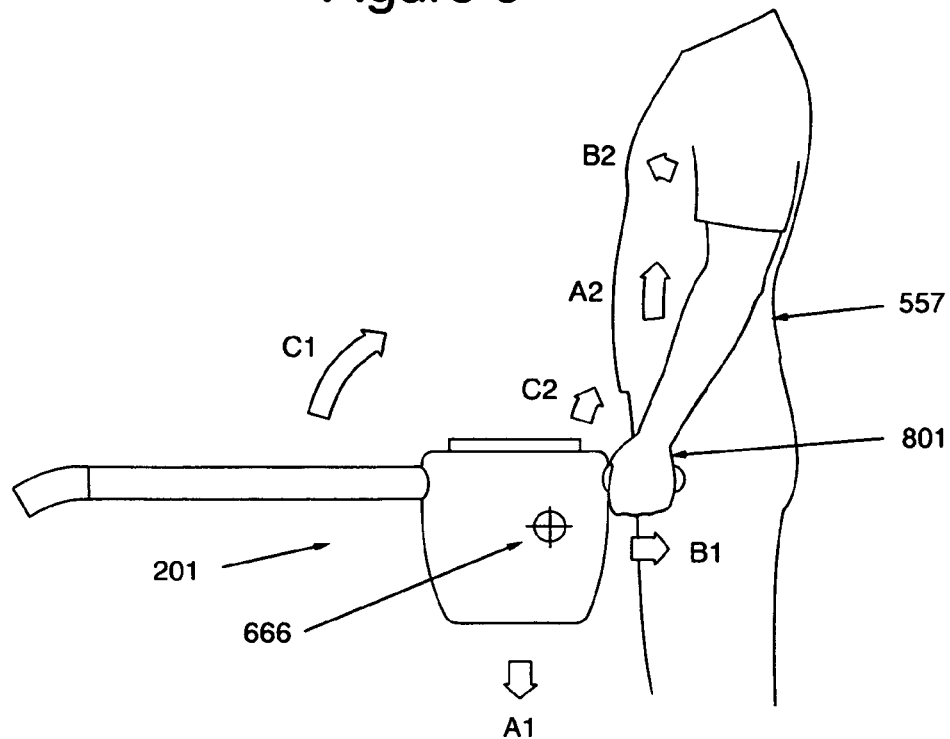
Fig. 9B
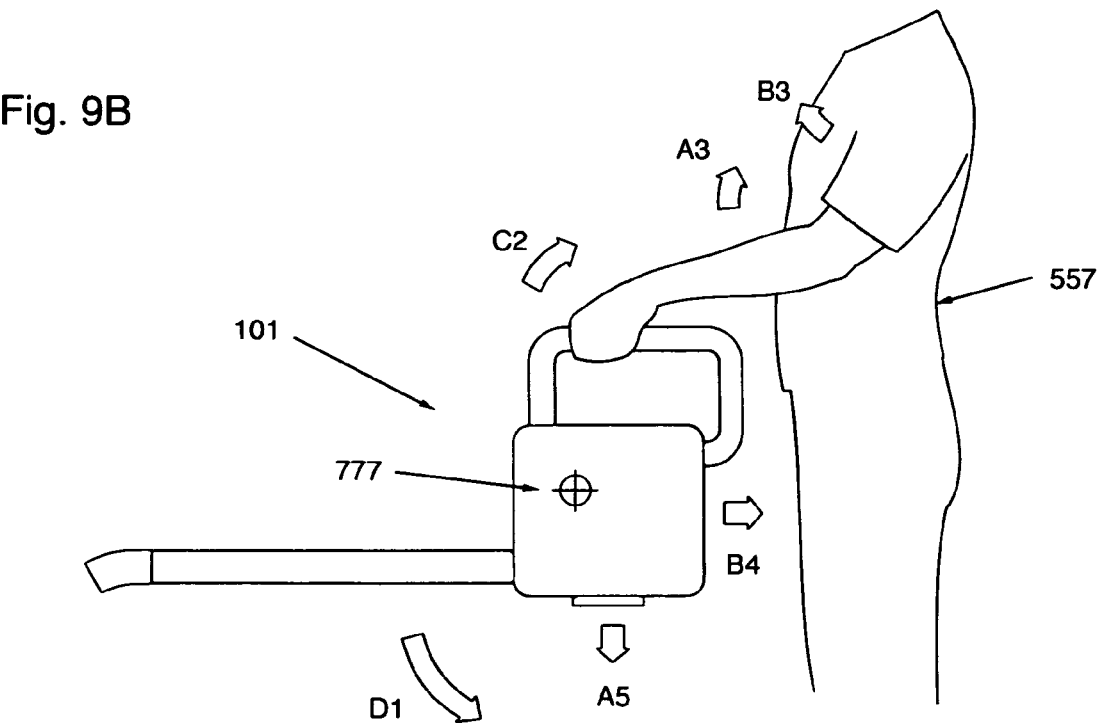

LEAF BLOWER

FIELD OF INVENTION

The invention is concerned with leaf blowers. These devices have a motor, fan, handgrip, and a directional spout to focus the force of the created air movement. This created forced air flow is used to move leaves and other small light debris. The invention is concerned with the ergonomic properties of a leaf blower.

BACKGROUND OF INVENTION

Traditionally Americans have removed leaves fallen from trees with special leaf rakes. The removal of leaves is desirable from an ascetic point of view as well as for lawn health. Decaying piles of leaves can cause death and decay of grass or other small plants. The use of leaf rakes is effective, but raking is time consuming and requires great human effort. Raking leaves is an unpopular part of life in America.

In recent decades leaf blowers have been manufactured and sold. These blowers ease the burden of raking leaves. They have a small electric or gasoline motor to power the enclosed fan. Air from this enclosed fan exhaust is directed at the ground covered with leaves. The air blast is used to clear the lawn of leaves and blows them into a pile for disposal.

Leaf blowers are a great aid for removal of leaves. Leaf blowers are sometimes used to move and clean small trash in garages. However, leaf blowers can be heavy and difficult to maneuver. In some cases the blowers are mounted as a backpack. Usually the combination of motor fan blower housing with exhaust tube is carried and maneuvered by a handgrip that is placed above the motor fan blower housing combination. The weight and forces generated by the leaf blower can quickly cause fatigue. The problem to be solved is how to have a unit powerful enough to blow leaves, and at the same time reduce the fatigue of the job of leaf blowing. The present invention addresses this problem by placing an air exhaust tube at the upper part of the housing and by placing an extended handle behind the housing so that the force of the exhausted air will aid the lifting of the leaf blower.

The improvements of the inventive leaf blower are the placement of the handle distal from the motor and fan. This distal placement of the handle is opposite the exhaust tube. The exhaust blowing in a downward motion can act as a third class lever lowering the apparent weight of the motor/fan housing component: A pommel or boss extending downward from the handle can attach to an article of clothing such as a belt so that downward blowing causes an uplifting of the fan motor combination which eases the operation of the leaf blower.

SUMMARY OF INVENTION

The invention is a leaf blower with a housing cover which encloses an air fan. The air fan is operationally melded with a motor. The enclosed air fan has an air inlet on the upper surface of the housing and an air exhaust portal. The air exhaust is connected to a first opening of a blower pipe which blower pipe terminates in a second opening of said blower pipe. The second pipe opening terminates in a turned down blower orifice. The blower pipe is placed on upper side of the housing cover. The leaf blower has a handle extending from the housing cover opposite the air exhaust. The handle has a pommel or hook attachment placed on a harness with a pouch attached to a belt or to an over the neck harness. Optionally, leaf blower has a handle with hooks and loops attachment which are affixed to a strap or harness. The handlegrip of the leaf blower connects with bend attachment to the housing cover and with an outer length to the extended handle. The handlegrip may connect solely with an outer length to the handle. The handlegrip may be attached with a forward connector between air intake and the air exhaust and have a second connector which attaches to housing cover. The handlegrip may be a closed circle handlegrip attached to the housing cover.

A preferred embodiment is a leaf blower with a housing cover enclosing a motor operationally melded with an air fan. The enclosed air fan has an air inlet placed on top of the housing cover and an air exhaust connected to a first opening of a blower pipe. The blower pipe terminates in a second opening of the blower pipe with a downward facing attached blower orifice extender. The air exhaust and the blower pipe are placed on upper side of the housing cover opposite a handle. That handle extends distal to housing cover and has a curved pommel or hook which removable attaches to a holster receptacle. The leaf blower has a handlegrip, with a variable speed trigger on bottom surface of the handgrip, and is connected with an outer length to the handle. The handlegrip terminates in an operator guide bar. The preferred embodiment leaf blower may have and inlet cover with vents and an extended support base.

BRIEF DESCRIPTION OF FIGURES

FIG. 2 shows the inventive leaf blower in a top view A and a side view B.

FIG. 3 shows various embodiments for handgrips and handles of the present invention.

FIG. 4 demonstrates the vector forces of the present inventive leaf blower A and the current art leaf blower B.

FIG. 5 shows 3 variations A, B, and C of a belt harness which can receive the curved pommel or hook on extended handle.

FIGS. 7 A, B, C, and D illustrates several of the various means of reversible attachment of the extended handle of the inventive leaf blower.

FIGS. 8 A and B show the operational advantage of the inventive leaf blower.

FIG. 9 illustrates the ergonomic advantage of the present invention.

DETAILED DESCRIPTION OF FIGURES

Figure 1:
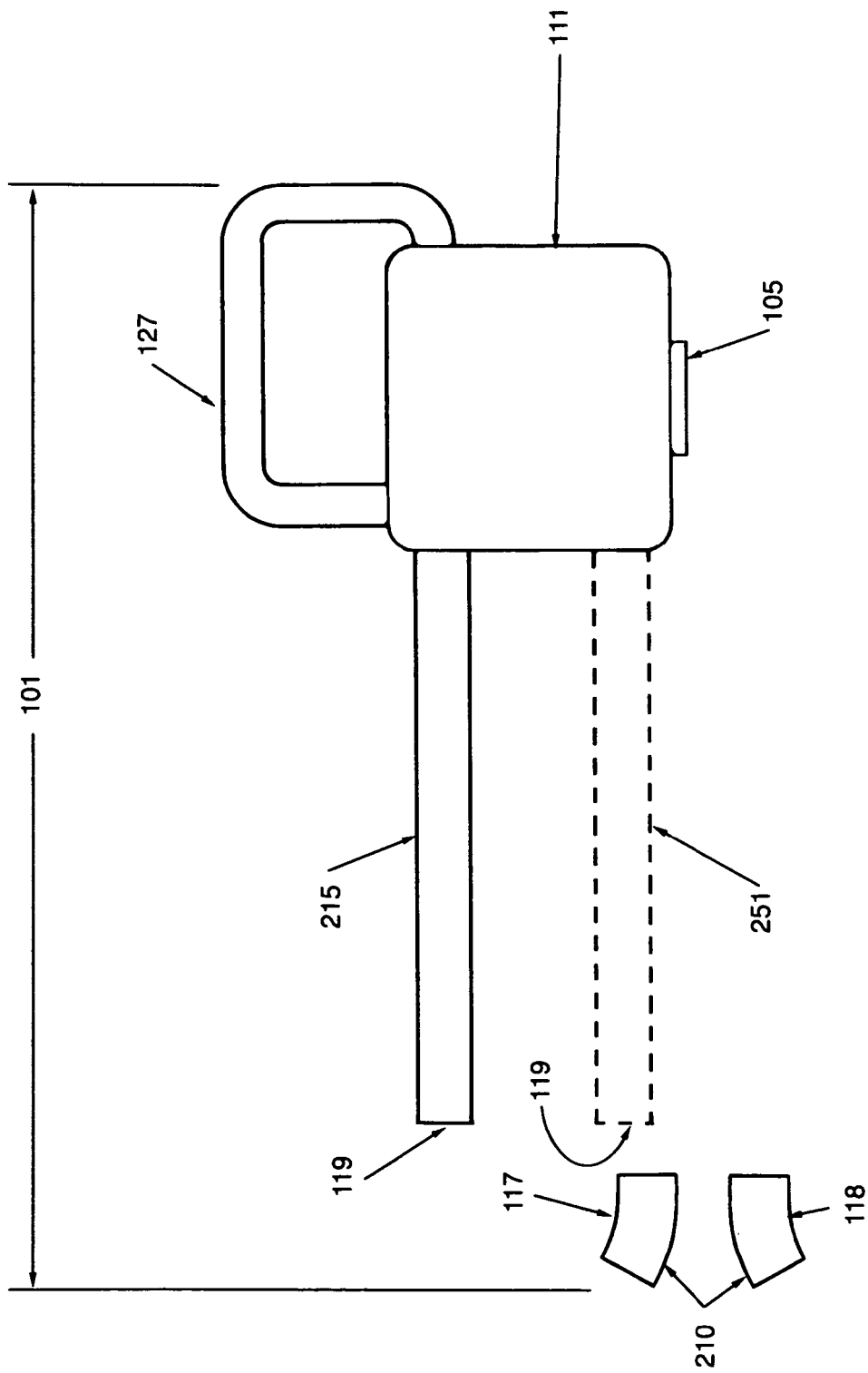
FIG. 1 shows a generic current art leaf blower 101.

FIG. 1 shows a generic current art leaf blower 101. A housing cover 111 encloses a motor with an operationally melded air fan. Housing cover 111 has handgrip 127. Housing cover has an air inlet 105 and an upper air blower pipe 215. Optionally in current art an air blower pipe is placed in the lower part of the housing shown in outline 251. Blower orifice extender 210 may be turned upward 117 or downward 118 and may be affixed to terminal end 119 of air blower pipe 251.

FIG. 2 shows the inventive leaf blower 201 in a top view A and a side view B. FIG. 2 A shows housing cover 203 which encloses a motor 211 and an air fan 209. Air fan 209 is operationally melded with motor 211. Air fan 209 has an air inlet 205 and an air exhaust portal 227. Air exhaust portal 227 is connected to a first opening 216 of a blower pipe 215.

Blower pipe 215 terminates in a second opening 213 of blower pipe 215. Blower orifice extender 210 is turned downward and is affixed to terminal end 213 of air blower pipe 215.

First air exhaust opening 216 of blower pipe 215 is placed on upper side 218 of housing cover 203 opposite extended arm (handle) 239. Extended handle 239 extends distal to housing cover 203 opposite air exhaust portal 227 and may have a curved pommel or hook 240 which can removably attach to a holster receptacle. See FIGS. 5 and 6.

FIG. 3 shows various embodiments for handgrips and handles of the present invention as in FIG. 2. FIG. 3 A shows side view of one embodiment of inventive leaf blower 201. Housing handgrip 221 connects with bend attachment 226 to housing cover 203 and distally to a outer length 225. Outer length 225 connects with extended handle 239. Extended handle 239 may have hooks and loops attachment means such as in FIG. 7. Housing handgrip 221 is opposite air exhaust portal 227. An operator holds housing cover 203 with melded motor and fan physically away from himself. This first embodiment shows that operator's hand will be mostly above handle 239.

FIG. 3 B shows side view of a second embodiment of inventive leaf blower 201. Handgrip 323 connects to an outer length 321 which connects with extended handle 239. Extended handle 239 may have hooks and loops attachment means. Handle 239 attaches to housing cover 203 opposite air exhaust portal 227. An operator holds inventive device 201 physically away from himself. Handgrip 323 may have an extension 375 shown in outline.

FIG. 3 C shows side view of a third embodiment of inventive leaf blower 201. Handgrip 423 connects forward connector 422 to housing cover 203 optionally between the air inlet 205 and air exhaust portal 227. Handgrip 423 has a second connector 421 which attaches to housing cover 203 between air inlet 205 and extended handle 239. Extended handle 239 has hooks and loops attachment means 241 and extends distal to housing cover 203 and has a curved pommel or hook 240. Pommel or hook 240 will removably attach to a holster receptacle. FIG. 7 shows several of the various attachment means that affix to extended handle 237.

FIG. 3 D shows side view of an embodiment which shows closed loop grip 525 attached between the air inlet 205 and air exhaust portal 227.

FIG. 4 demonstrates the vector forces of the present inventive leaf blower A and the current art leaf blower B. FIG. 4 A shows housing cover 203 which encloses a motor with an operationally melded enclosed air fan 209. Housing cover 203 in FIG. 4 A has an air inlet 205 and an upper air blower pipe 115. Note, extended handle 239 extends distal to housing cover opposite air blower pipe 115. When extended handle 239 is extended rearward, the center of gravity is approximately as shown as spot 666.

FIG. 4 B is a generic current art. Note handgrip 127 is placed generally on the top of housing cover 111. Note, center of gravity 777 is forward the center of gravity 666 of inventive device 201. Air blowing out of blower pipe 115 in both A and B produces leveraged force G with current invention A and leveraged force H in current art B.

In FIG. 4 B the leveraged force H is essentially opposed by the hand of the operator located on grip 127. The bulk of the weight is carried by the hand of the operator. In contrast, the present inventive art has the center of gravity located at point 666 because handle 239 is placed to the rear of housing cover 203. The leveraged lifting force G aids in lifting of the housing 203 by third class lever action thus lessening the apparent weight of the blower. Turned down nozzle 225 aids the upward force G and opposes force H.

An addition increase of upward force can be obtained with an air inlet on the top of the housing as in 205.

The primary inventive element of the present invention is that it is counterintuitive to place the handle of a leaf blower behind the housing unit. Intuitively, the handle is placed on top of the housing as is in the current art.

FIG. 5 shows 3 variations A, B, and C of a belt harness which can receive the curved pommel or hook 240 on extended handle 239.

FIG. 5 A shows an ordinary waist belt 555 around the torso of the operator 557. Note pouch 565 is attached to belt 555 and is placed in this instance at the side of operator 557.

FIG. 5 B shows shoulder support 559 over operator 577. In this instance the pouch 565 is at the side of operator 557.

FIG. 5 C shows a waist belt 555 and a neck strap 563. In FIG. 5 C both the waist belt 555 and the neck strap 563 support the holster receptacle 565.

Figure 6:
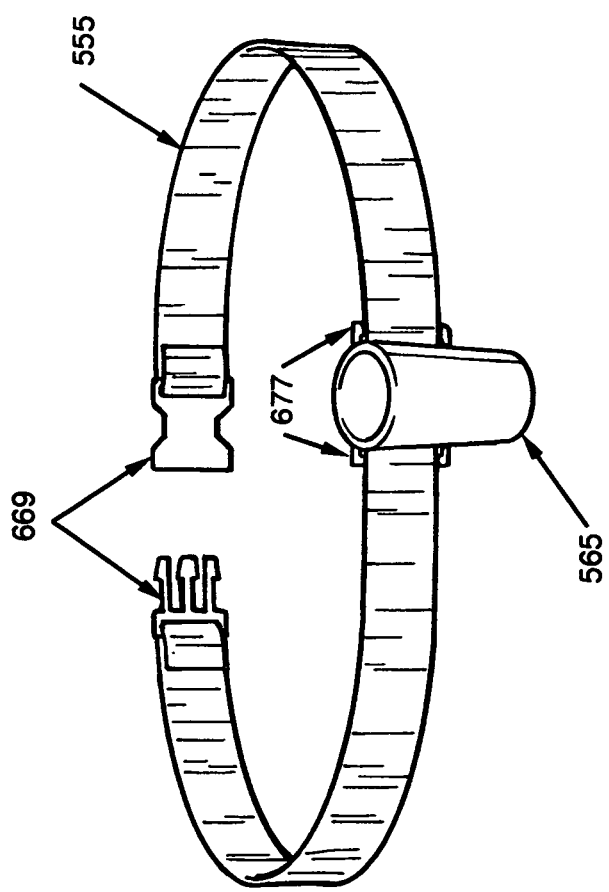
FIG. 6 shows a holster receptacle which can receive the curved pommel or hook.

FIG. 6 shows holster receptacle 565 which can receive the curved pommel or hook 240 on handle 239. Holster receptacle 565 is attached with belt hoop openings 677 to a belt 555. Belt 555 is completed as a closed belt with generic joiners 669. Holster receptacle 565 may be attached with a clip. (Not shown)

FIGS. 7 A, B, C, and D illustrate several of the various means of reversible attachment of the extended handle 239 of the inventive leaf blower 201. Leaf blower 201 affixes to body supports such as 555, 559, or 563.

FIG. 7 A shows a top partial view 201 G, and a side view 201 H of inventive device 201. Extended handle 239 has a hole 341 with loop 343 passing through. A snap click 345 can affix by snapping through loop 343 and attach to body supports such as 555, 559, or 563.

FIG. 7 B shows handle 239 of the inventive leaf blower 201 with button attachment 353. Keyhole slot holder 355 has a keyhole shaped hole 357 which can affix to button attachment 353.

FIG. 7 C shows that handle 239 has a blade 347 with blade hole 349. A snap click 345 can affix by snapping through blade hole 349 and attach to body supports such as 555, 559, or 563.

FIG. 7 D embodiment shows the preferred reversible attachment means. Pommel or hook 240 will removably attach to a holster receptacle 565 attached to body supports such as 555, 559, or 563.

FIGS. 8 A and B show the operational advantage of the inventive leaf blower 201 which has center of gravity approximately as shown as spot 666. Operator 557 is in an ergonomic desirable position with hand 801 at side of operator 557. Operator 557 can easily move leaf blower 201 to side and direct down turned nozzle 210 of blower pipe 215.

FIG. 8 B shows that the use of preferred embodiment can be shifted from a hand held operation to a holster 565 supported operation. Outer length 321 has an upper handgrip 323. Handgrip 323 can be moved by hand 801 to direct down turned nozzle 210 of blower pipe 215.

FIG. 9 A illustrates the ergonomic advantage of the present invention wherein the operator 557 holds the inventive leaf blower 201 at his left side with his left hand 801. Notice the air exiting from turned down nozzle 210 of blower pipe 215 creates upward vector shown as C1. Vector force C1 acts through center of gravity 666 making a smaller vector force C2. Note there is ergonomically desirable force A1 is directed in a down manner and not away from the body as seen as vector force A2. Note, there is minimal forward force vector B2 affecting operator 557.

FIG. 9 B shows generic current art leaf blower 101 with center of gravity 777 forward center of center of gravity 666 of inventive device 201 This position is desirable so that operator 557 can maneuver the leaf blower over a wide arc of operation in a manner analogous with the maneuvering of the inventive leaf blower 202 shown in FIG. 8 B. Operator 557 holds housing cover 203 with melded motor and fan physically away from that operator 557. Note force D1 is downward rather the generally upward as is vector force C1 in FIG. 9 A. Note, vector force (apparent weight) A5 is greater then vector force A1. Vector force B4 is greater than vector force B1 (9A). Likewise, vector force A3 is greater than vector force A2, and vector force B3 is greater than vector force B2.

Figure 10:
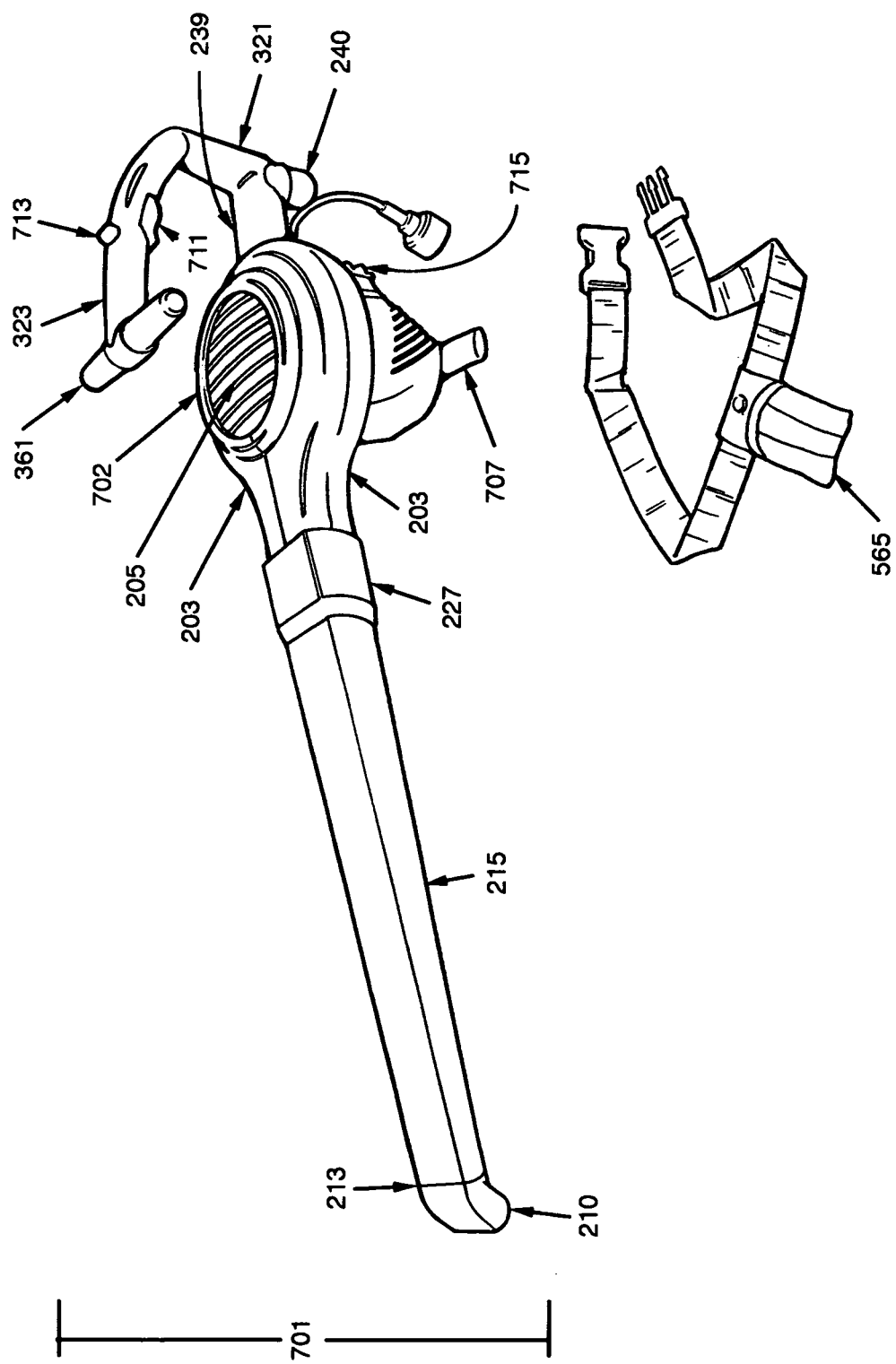
FIG. 10 shows a perspective view of preferred embodiment of the present invention.

FIG. 10 shows a perspective of preferred embodiment 701 of the present invention. Housing cover 203 encloses a motor 211 and an air fan 209. Air fan 209 has an air inlet 205 on upper side 702 and an air exhaust portal 227. Extended handle 239 extends distal to housing cover 203 and has a curved pommel or hook 240. Curved pommel or hook 240 will removably attach to a holster receptacle 565. Handle 239 is connected with outer length 321 to handlegrip 323. Handlegrip 323 terminates with operator guide bar 361. Operator 557 holds housing cover 203 with melded motor and fan physically away from himself. A turned down blower orifice 210 may be affixed to terminal end of air blower pipe 215. An extended support base 707 allows leaf blower 701 to remain in an upright position. Variable speed trigger (pistol type trigger) 711 is on the bottom surface of handgrip 323. Trigger-holding button 713 on the top surface of upper length 323 holds the variable speed trigger in place when the user adjusts the motor to the desired speed. A second variable speed rotary knob 715 on the rear of the main housing adjusts the power range. Note the increased area of the air intake port 205 on the top of the housing to allow for increased fan size.

Figure 11:
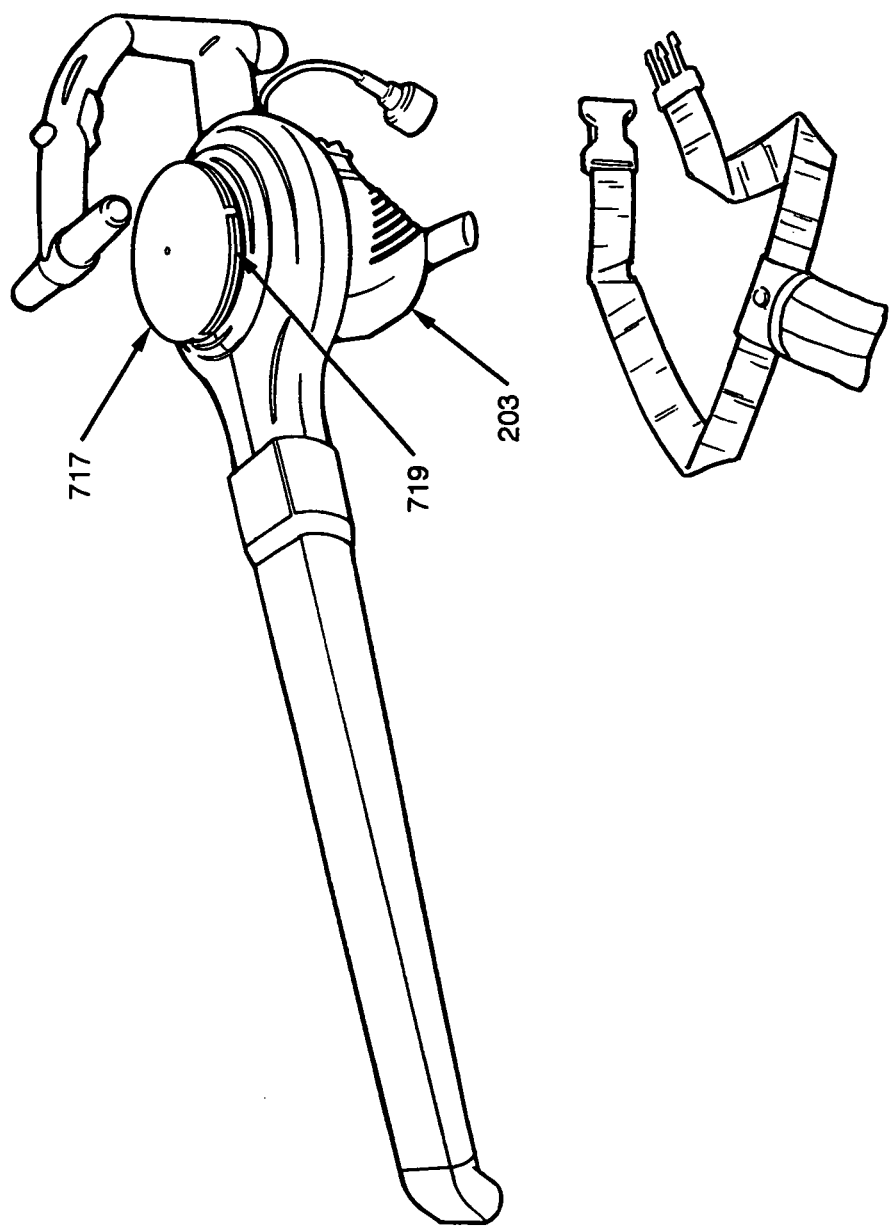
FIG. 11 shows a modification of preferred embodiment.

FIG. 11 shows a modification of preferred embodiment 701 shown in FIG. 10. Housing cover 203 encloses a motor 211 and an air fan 209. Air inlet 205 on upper side 702 of housing 203 has an air inlet cover 717 and air is sucked to air fan 209 through vents 719. This optional air vent cover may be useful in certain environments which may have water or other undesirable solid material in the ambient air.

We claim:

1. A leaf blower with ergonomic advantages comprising:
a housing cover;
said housing cover encloses a motor and an air fan with a blower housing;
said air fan is operationally melded with said motor;
said enclosed air fan has an air inlet and an air exhaust portal;
said air inlet is on the upper surface of said housing;
said air exhaust is connected to a first opening of a blower pipe;
said blower pipe terminates in a second opening of said blower pipe;
said air exhaust with said blower pipe is placed on upper side of said housing cover;
a handle extending from said housing cover opposite said air exhaust;
wherein said blower pipe, said air inlet, and said handle are in a midline presentation;
wherein said ergonomic advantages of said leaf blower comprise;
a favorable center of gravity;
said handle extending from said housing cover opposite said air exhaust acts as a fulcrum placement point;
said air exhaust of said second opening of said blower pipe acts on said fulcrum placement point.

2. A leaf blower as in claim 1 wherein said second pipe opening terminates in a turned down blower orifice.

3. A leaf blower as in claim 1 wherein said handle has a pommel or hook attachment.

4. A leaf blower as in claim 3 wherein said pommel or hook attachment is placed on a harness with a pouch.

5. A leaf blower as in claim 4 wherein said pouch is attached to a belt.

6. A leaf blower as in claim 4 wherein said pouch is attached to an over the neck harness.

7. A leaf blower as in claim 4 wherein said pouch is attached to a shoulder harness.

8. A leaf blower as in claim 1 wherein said handle has hooks and loops attachment means.

9. A leaf blower as in claim 8 wherein said hooks and loops attachment means are attached to a strap or harness.

10. A leaf blower as in claim 1 wherein a handlegrip upper length connects with bend attachment to housing cover and with an outer length to said extended handle.

11. A leaf blower as in claim 1 wherein a handlegrip connects with an outer length to said handle.

12. A leaf blower as in claim 1 wherein a handlegrip is attached with a forward connector between air intake and said air exhaust;
said handgrip has a second connector which attaches to housing cover.

13. A leaf blower comprising:
a housing cover;
said housing cover encloses a motor and an air fan with a blower housing;
said air fan is operationally melded with said motor;
said enclosed air fan has an air inlet placed on top of said housing cover;
an air exhaust is connected to a first opening of a blower pipe;
said blower pipe terminates in a second opening of said blower pipe;
said air exhaust and said blower pipe is placed on upper side of said housing cover opposite a handle;
said handle which extends distal to housing cover has a curved pommel or hook which removably attaches to a holster receptacle;
a handlegrip which is connected with an outer length to said handle;
a variable speed trigger is on bottom surface of said handgrip.

14. A leaf blower as in claim 13 wherein said air inlet has a cover with vents.

15. A leaf blower as in claim 13 wherein said housing cover has an extended support base.

16. A leaf blower as in claim 13 wherein a variable speed trigger is on bottom surface of said handgrip.

17. A leaf blower as in claim 13 wherein said handlegrip terminates in an operator guide bar.

18. A leaf blower as in claim 13 wherein said second opening of said blower pipe has an downward facing attached blower orifice extender.

* * * * *